(12) United States Patent
Hugo

(10) Patent No.: US 6,459,939 B1
(45) Date of Patent: Oct. 1, 2002

(54) PERFORMANCE ASSESSMENT OF MODEL PREDICTIVE CONTROLLERS

(75) Inventor: Alan J. Hugo, 616 Bobbie Dr., Danville, CA (US) 94526

(73) Assignee: Alan J. Hugo, Danville, CA (US)

( * ) Notice: Subject to any disclaimer, the term of this patent is extended or adjusted under 35 U.S.C. 154(b) by 0 days.

(21) Appl. No.: 09/340,531

(22) Filed: Jun. 29, 1999

(51) Int. Cl.7 ............................ G05B 13/02; G21C 17/00
(52) U.S. Cl. ............................ 700/44; 700/29; 702/182
(58) Field of Search .................... 700/9, 28, 21, 700/29, 108, 109, 174, 32, 51, 44, 45, 30, 31; 702/81, 182, 183, 186

(56) References Cited

U.S. PATENT DOCUMENTS

| | | | | |
|---|---|---|---|---|
| 5,347,446 A | * | 9/1994 | Iino et al. | 700/29 |
| 5,535,117 A | * | 7/1996 | Hiroi | 700/38 |
| 5,568,378 A | * | 10/1996 | Wojsznis | 700/44 |
| 5,740,033 A | * | 4/1998 | Wassick et al. | 700/29 |
| 5,796,606 A | | 8/1998 | Spring | 700/9 |
| 5,838,561 A | | 11/1998 | Owen | 700/32 |
| 6,208,949 B1 | * | 3/2001 | Eatwell | 702/189 |
| 6,381,505 B1 | * | 4/2002 | Kassmann et al. | 700/44 |

OTHER PUBLICATIONS

Desborough, L.D., & Harris, T.L., 1992, Performance Assessment for Univariate Feedback Controllers.
Cdn. J. of ChemEng 70, 1992 pp 1186–1197.
Harris, T.J., Seppala, C.T., & Desborough, L.D., 1999, A Review of Performance Monitoring and Assessment.
J. of Process Control 9, 1999, pp 1–17, Techniques For Univariate and Multivariate Control Systems.

* cited by examiner

Primary Examiner—Maria N. Von Buhr
Assistant Examiner—Paul Rodriguez

(57) ABSTRACT

A method for determining the performance of model predictive controllers requiring only closed-loop data and an estimate of the process deadtime. A numerical measure is calculated which is a comparison of the actual variation of the process to the variation that would be expected if the process were controlled by a model predictive controller with no move suppression and no model mismatch. The measure accounts for the fact that the disturbance model employed in the Model Predictive Controller may be different from the actual process disturbance.

1 Claim, No Drawings

PERFORMANCE ASSESSMENT OF MODEL PREDICTIVE CONTROLLERS

CROSS-REFERENCE TO RELATED APPLICATIONS

Patents:

U.S. Pat. No. 5,838,561 Automatic control loop monitoring and diagnostics

U.S. Pat. No. 5,796,606 Process information system for distributed control systems U.S. Pat. No. 6,208,949 Method and apparatus for dynamical system analysis

BACKGROUND—FIELD OF INVENTION

This invention relates to a technique to accurately assess the performance of Model Predictive Controllers. Specifically, the technique accounts for the known disturbance model of the controller in assessing the controller performance.

BACKGROUND—DISCUSSION OF PRIOR ART

Model Predictive Controllers (also termed Dynamic Matrix Controllers, Multi-Variable Controllers, etc.) are widespread in industry and account for significant economic benefits. It is necessary to evaluate the performance of these controllers for the following reasons:

1. Evaluate current benefits of the Model Predictive Controller (MPC) application.
2. Explore future control opportunities.
3. Analyze current controller shortcomings.

Performance is largely defined it two ways: 1) How well does the controller maintain the process measurement at setpoint; and 2) How effectively does the controller determine the optimum operating conditions. Methods for evaluating the first question are the subject of this patent.

The simplest and most direct technique of determining controller performance is to calculate the variance between the measurement (PV) and the setpoint (SP), i.e., $$\sigma^2 = \frac{1}{n}\sum_{i=1}^{n}(PV-SP)^2$$

While simple to calculate, this measure has the extreme disadvantage that it is dependent on the level of disturbances or setpoint changes (i.e., the only reason why the SP would not equal the PV is due to disturbance/setpoint changes), and is thus more an indication of the disturbance/setpoint spectrums than the capabilities of the controller.

For this reason Harris et al. (1992) (Harris, T., and Desborough, L., Performance Assessment Measures for Univariate Feedback Control, Cdn J. of Chem. Eng., 70, pp 1186–1197, 1992) defined a Performance Index measure ($\eta$) that is independent of the disturbance/setpoint change spectrum and can be readily used to determine the actual performance of the controller. This measure compares the performance of the controller to a theoretical Minimum Variance controller (i.e., the best physically realizable linear controller), and can be calculated from routine operating data. This latter property is a strong advantage, as no plant tests are required to determine the measure. This measure is common in industry and is often referred to as the Harris Performance Index. This technology described in this patent is a modification or extension to the Harris Performance Index to account for one of the limitations of Model Predictive Controllers.

The Minimum Variance controller referenced by Harris (1992) employs an open-loop model of the process in the following form:

$$y_t = \frac{\omega(B)B^b}{\delta(B)}u_t + \frac{\theta(B)}{\phi(B)\nabla^d}a_t \tag{1}$$

This is standard time series notation for process transfer functions, and says that the output $y_t$ is a function of the input $u_t$ and an independent white noise input $a_t$. The input passes through a linear discrete process model, while the noise input passes through a linear discrete disturbance model Some model predictive controllers use a slightly different formulation of the process model, but the results are invariant to this different formulation.

The minimum variance controller requires full specification of the disturbance model (the second term on the right hand side (RHS) of equation 1). In contrast, the majority of model predictive controllers (MPC) use the following model in their design:

$$y_t = \frac{\omega(B)B^b}{\delta(B)}u_t + \frac{1}{\nabla}a_t \tag{2}$$

Note the simplified disturbance model term. The reason for this simplified model is that it does not require parameter identification from plant tests (generally very difficult as the input sequence $a_t$ is by definition unscheduled and unmeasured), and this form of the disturbance model results in robust control.

This is problematic for the Harris Performance Index. The actual disturbance entering the process is often more accurately of the form:

$$n_t = \frac{(1-\theta_1 B)}{(1-\phi_1 B)\nabla}a_t \tag{3}$$

For processes under MPC control and with the above disturbance entering the process, the Harris Performance Index will indicate poor control, even if the process model is exact and there are no restrictions in the input movement. While this is correct (the MPC controller is in fact sluggish under these circumstances compared to a minimum variance controller), it is of not much use to the practicing control engineer.

This is because the control engineer needs to determine if the sluggishness is a result of the two factors under his control, namely controller tuning and model fidelity. The control engineer has no control over the structure of the disturbance model in the controller. As the Harris Performance Index does not differentiate between the causes of poor control, the Harris Performance Index can be of limited use, or even misleading.

While the minimum variance controller used as a reference controller by Harris et al., requires specification of a full open-loop process and disturbance model, an estimate of the performance of a minimum variance controller does not require specifying or determining any process or disturbance model. In contrast, while a Model Predictive Controller does not require specifying a disturbance model, determining the performance of a Model Predictive Controller does require that the disturbance model be specified.

There are other less sophisticated performance measurements used by industry. A common one is an autocorrelation graph of the controller errors (i.e., PV-SP), but this suffers from the same deficiency as the Harris Performance Index. A disturbance of the form of Equation 3 will result in significant autocorrelation even if the process transfer function is perfect and there are no input move restrictions.

Of concern in the present invention is to determine the performance of Model Predictive Controllers using normal closed-loop operating data Also of concern in the present invention is for the performance measure to reflect the structure of assumed disturbance model in the MPC controller.

It is, therefore, a feature of the present invention to provide a method to determine the performance of a Model Predictive Controller.

It is, also, a feature of the present invention that it only requires normal operating data to determine the controller performance.

Yet another feature of the present invention is that the performance measure adequately reflects the structure of the assumed disturbance model in the Model Predictive Controller.

It is, also, a feature of the present invention that it has the same range and interpretation as the Harris Controller Performance Index.

Additional features and advantages of the invention will be set forth in part in the description which follows, and will in part be apparent from the description, or may be learned from practice of the invention. The features and advantages of the invention may be realized by means of the combinations and steps pointed out in the appended claims.

SUMMARY

To achieve the objectives, features, and advantages, in accordance with the purpose of the invention as embodied and broadly described herein, a method to determine the performance of a Model Predictive Controller is provided. This performance measure accounts for the fixed disturbance model of Model Predictive Controllers and may be calculated using only on-line data.

OBJECTS AND ADVANTAGES

Accordingly, besides the objects and advantages of the Model Predictive Controller Performance Index described above, several objects and advantages of the present invention are:

a) to assess the performance of a Model Predictive controller using only normal operating data;

b) to obtain a measure that has the same interpretation and range of the Harris controller performance index;

c) to obtain a measure that accounts for the fixed disturbance model structure of the controller;

d) to obtain a measure that is not indicative of the actual disturbance model of the process, but indicates the process model fidelity and tuning of the controller;

e) to estimate disturbance model parameters using only closed-loop data and an estimate of the deadtime.

DESCRIPTION

The algorithm for Performance Assessment of Model Predictive Controllers closely follows the work by Harris et al. (1992). The derivation of the index and notation is largely the same, with a few important exceptions to handle the limited disturbance model of the Model Predictive Controller. The first 2 steps, which are unique to this patent application, involve estimating the disturbance model from closed-loop data; the last two steps describe the modifications to the Harris Performance Index to account for the disturbance model.

1. Calculate closed-loop impulse weights ($\psi_t$), such that:

$$\tilde{y}_t = (1 + \psi_1 B + \psi_2 B^2 + \ldots + \psi_m B^m) a_t \qquad (4)$$

Here B is the backwards shift operator (i.e., $B\tilde{y}_t = \tilde{y}_{t-1}$), $\tilde{y}_t$ are the mean-corrected deviations from setpoint, and $a_t$ is a normally-distributed input sequence. Since these cannot be estimated directly from normal operating data, it is necessary to estimate the inverse model, i.e., $$\tilde{y}_t = (a_1 B + a_2 B^2 + \ldots + a_m B^m)\tilde{y}_t + a_t \qquad (5)$$

Normal least squares may be used to estimate the α parameters from operating data. Equation (5) may be expressed as a function of $a_t$ only, i.e., $$\tilde{y}_t = \frac{a_t}{1 - \alpha_1 B - \alpha_2 B^2 - \ldots - \alpha^m B^m} \qquad (6)$$

The impulse weights vy may be determined from this equation by the formula:

$$\psi_i = \sum_{j=1}^{i} \alpha_j \psi_{i-j} \qquad (7)$$

The impulse weights may also be determined by other methods, for instance, non-linear least squares.

2. Determine the disturbance noise model parameters from the impulse weights. These parameters are in the general disturbance model form:

$$n_t = \frac{(\theta_0 + \theta_1 B + \ldots + \theta^p B^p)}{(1 - \phi_1 B - \ldots - \phi^q B^q)\nabla^d} a_t \qquad (8)$$

For an autoregressive-integrated-moving average (ARIMA)(1,1,0) model, the autoregressive parameter can be approximated by:

$$\phi_1 = \frac{1}{s}\sum_{i=1}^{s} \frac{\psi_i}{\psi_{i-1}} \qquad (9)$$

The value of s is generally the interval when the impulse parameters are greater than some confidence value, and is always less than or equal to the deadtime. The key and novel observation here is that, since the controller has no affect of the process before the deadtime, then impulse weights before the deadtime are a function of the disturbance only (and not the controller or model mismatch). Therefore, these terms represent an unbiased estimate of the disturbance impulse weights. While Harris et al. (1992) employed equations similar to Equation 6 to determine the closed-loop response before the deadtime, employing these parameters to calculate the open-loop process disturbance model has not been proposed before.

It may be shown that, for a model predictive controller (a special case of the minimum variance controller) with no move suppression or model error and a step disturbance model, that an approximation to the closed loop response of the controller would be:

$$\tilde{y}_t = (1 - B^b) \frac{\theta(B)}{\varphi(B)\nabla^d} a_t \quad (10)$$

$$= 1 + \psi_1 B + \psi_2 B^2 + \ldots + \psi_m B^m$$

The contribution of the Model Predictive Controller at and after the deadtime is:

$$\psi_3(B)a_t = (\psi_{3,b}B^b + \psi_{3,b+1}B^{b+1} + \ldots + \psi_{3,m}B^m)a_t \quad (11)$$

Equations 10 and 11 are novel and unique to this patent application.

3. The Model Predictive Controller (MPC) Performance Index is defined as below. First, assume the closed loop impulse weights can be divided into 3 terms $$\tilde{y}_t = \psi(B)a_t \quad (12)$$

$$= \psi_1(B)a_t + \psi_2(B)a_{t-b} + \psi_3(B)a_t$$

Here b is the process deadtime, and $$\psi_1(B) = 1 + \psi_{1,1}B + \psi_{1,2}B^2 + \ldots + \psi_{1,b-1}B^{b-1} \quad (13)$$

$$\psi_2(B) = 1 + \psi_{2,1}B + \psi_{2,2}B^2 + \ldots + \psi_{2,m}B^m \quad (14)$$

Equation (13) represents the response of the process before the deadtime, and is invariant to the controller. Equations (14) and (11) represent the response after the deadtime, which is affected by the controller. Equation (14) is the contribution due to model mismatch and detuning, and Equation (11) represents the response due to the controller having the wrong disturbance model. Note that Equation (12) is similar to Equation (5) in Harris et al, (1992), with the difference that the response of the process after the deadtime is separated into two parts.

Equation (12) may be rearranged to give:

$$\tilde{y}_t - \psi_3(B)a_t = \psi_1(B)a_t + \frac{\psi_2(B)}{\psi(B)} \tilde{y}_{t-b} \quad (16)$$

$$= e_t + \sum_{k=1}^{\infty} \alpha_k \tilde{y}_{t-b-k+1}$$

All terms on the left hand side (LHS) of this equation are known. As in Harris et al. (1992), the first m α parameters in Equation 16 may be estimated using least squares and normal operating data. In matrix form, Equation 16 is:

$$\underline{\tilde{y}} = \underline{X}\underline{\alpha} + \underline{e} \quad (17)$$

where $$\underline{\tilde{y}} = \begin{bmatrix} \tilde{y}_n - \psi_3(B)a_n \\ \tilde{y}_{n-1} - \psi_3(B)a_{n-1} \\ \vdots \\ \tilde{y}_{b+m} - \psi_3(B)a_{b+m} \end{bmatrix} \quad (18)$$

$$\underline{X} = \begin{bmatrix} \tilde{y}_{n-b} & \tilde{y}_{n-b-1} & \cdots & \tilde{y}_{n-b-m+1} \\ \tilde{y}_{n-b-1} & \tilde{y}_{n-b-2} & \cdots & \tilde{y}_{n-b-m} \\ \vdots & \vdots & \ddots & \vdots \\ \tilde{y}_m & \tilde{y}_{m-1} & \cdots & \tilde{y}_1 \end{bmatrix}$$

-continued $$\underline{\alpha} = \begin{bmatrix} \alpha_1 \\ \alpha_2 \\ \vdots \\ \alpha_3 \end{bmatrix}$$

The parameter estimates are found by solving the set of equations:

$$(\underline{X}^T \underline{X})\underline{\alpha} = \underline{X}^T \underline{\tilde{y}} \quad (19)$$

As in Harris et al. (1992), the residual mean square error is given by:

$$s_e^2 = \frac{(\underline{\tilde{y}} - \underline{X}^T \underline{\alpha})^T (\underline{\tilde{y}} - \underline{X}^T \underline{\alpha})}{(n - b - 2m + 1)} \quad (20)$$

And the least squares estimate for the normalized performance index η (b) is $$\hat{\eta}(b) = 1 - \frac{n - b - m + 1}{n - b - 2m + 1} \frac{(\underline{\tilde{y}} - \underline{X}^T \underline{\alpha})^T (\underline{\tilde{y}} - \underline{X}^T \underline{\alpha})}{\underline{\tilde{y}}^T \underline{\tilde{y}} + \overline{y}^2} \quad (21)$$

Additional Embodiments

1) Extension to the multivariable (multiple coupled inputs and outputs) case may be done. The multivariable case for minimum variance control has been formulated (Harris, et. al., *Performance Assessment of Multivariable Controllers,* Automatica, 32, No 11, pp 1505–1518, 1996), and extending this for the MPC disturbance models would largely follow the modifications detailed in this patent.
2) Other controllers (such as Proportional-Integrating-Derivative (PID)) may also be evaluated using small modifications to this method.
3) Other controller disturbance models (for instance, a first order disturbance model) may be used rather than the step disturbance model. This would involve mainly a modification to Equation 10.
4) Feedforward controllers and setpoint change models may be incorporated into the analysis.
5) The performance index (Equation 21) may be defined differently by suitable algebraic manipulations.
6) The performance measurement may be extended to the time and frequency domain.

Conclusions, Ramifications, and Scope

Accordingly, the reader will see that the method described herein is able to measure the performance of a Model Predictive Controller so that it may be determined if it is detuned or has model mismatch. This method requires only on-line data, and is insensitive to the process disturbance or setpoint spectrums.

Although the description above contains many specificities, these should not be construed as limiting the scope of the invention but as merely providing illustrations of some of the preferred embodiments of the invention.

Thus the scope of the invention should be determined by the appended claims and their legal equivalents, rather than the derivations given.

What is claimed is:

1. A method of determining the performance of Model Predictive Controllers comprising:

a) first means for estimating a closed-loop response from a given set of closed-loop data;
b) second, means for estimating a process disturbance model;
c) the said process disturbance model is estimated from the said closed-loop response,
d) the said process disturbance model is estimated from said closed-loop response for time periods less than a given process deadtime,
e) third, means for determining a process response under model predictive control with no move suppression and no model mismatch from said process disturbance model and said closed-loop data;
f) fourth, means for calculating an error between the said closed-loop data and said process response under model predictive control with no move suppression and no model mismatch; and
g) fifth means for comparing an actual process variation to said error.

* * * * *